Patented Mar. 16, 1954

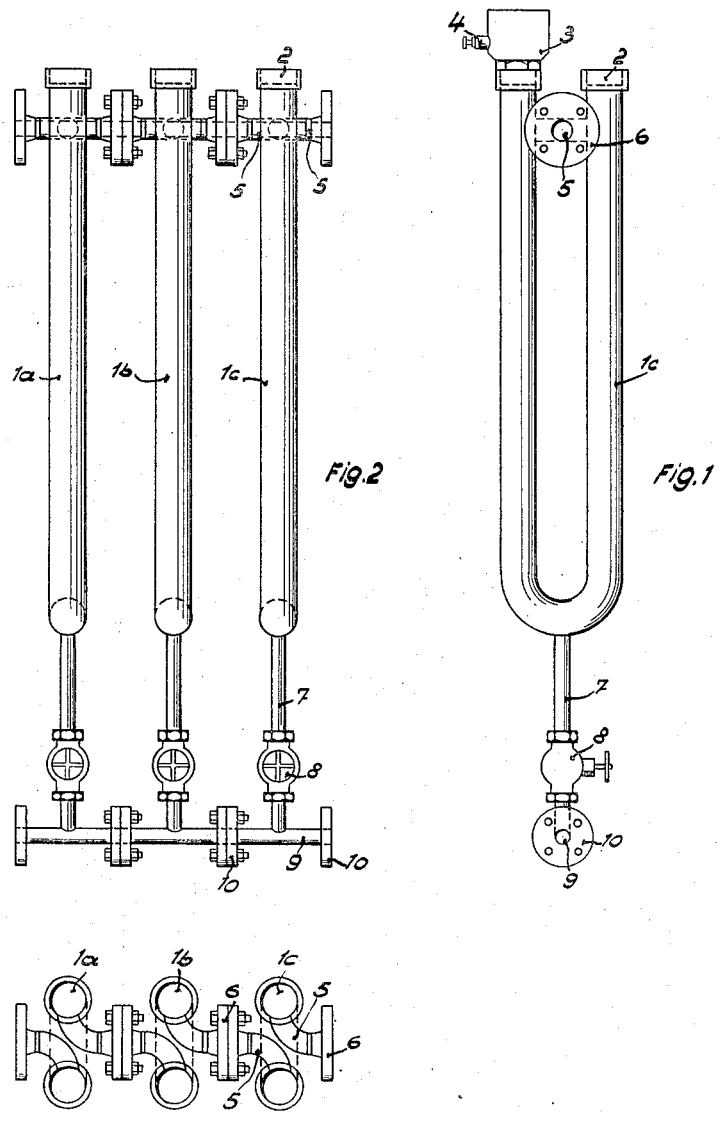

2,672,549

UNITED STATES PATENT OFFICE 2,672,549

APPARATUS FOR HEATING OR SUPERHEATING FLUENT MEDIA USING THE HEATING EFFECT OF ELECTRICAL CURRENTS

Albert Häberle, Essen-Werden, and Fritz Dittmer, Essen, Germany, assignors, by mesne assignments, to Koppers Company, Inc., Pittsburgh, Pa., a corporation of Delaware Application December 13, 1951, Serial No. 261,569

Claims priority, application Germany December 14, 1950

4 Claims. (Cl. 219—38)

The present invention relates generally to means or apparatus for the heating or superheating of fluent media, and in particular to devices of this nature in which the heat is derived from the heating effect of electrical current flow. Inter alia, devices of this kind are used in the treatment of by-products of the coking industry as so-called steam superheaters, for example for the production of superheated steam for regenerating the wash oil from benzol washing plants.

The size of the heating apparatus depends on the quantity and the temperature of the fluent medium required and, within certain limits, can be calculated in advance. In a case where a superheater has been calculated so as to give a specific performance and then built, it has only hitherto been possible to replace this apparatus as a whole by a corresponding apparatus of larger or smaller output, when so required, a step which has frequently been found necessary for various reasons after the whole plant has been put into operation. Furthermore, when a part of the superheater apparatus became defective it was also necessary to arrest the operation of the whole of the heating plant until the defective part had been repaired. The result was very troublesome interruptions in the operation of the plant and aggravated operating costs.

These difficulties met with in known forms of heater apparatus are overcome by the present invention in that here the apparatus is built up of independent, individually-replaceable units which are capable of being connected up in spaced relation side-by-side, in a row one behind another, in appropriate succession and number, and which may suitably be oriented for interconnection through 180° one in relation to the next, each of these units being provided with an inflow and an outflow pipe, each of which is equipped with an end flange, for the fluent medium, which pipes serve for connection to adjacent like units, and each unit having at least one opening for the insertion of an electrical heating element.

The improvement secured by the apparatus according to the invention is manifest. Increases or reductions in the output of the heating apparatus are obtained simply by adding or subtracting one or more of the independently-usable heater units. An alteration of this nature can be carried out in a very short period of time, i. e. without a lengthy interruption of the operation of the plant, and involves comparatively small installation costs. In the event that one or more of the heater units become defective, this likewise can be replaced by a new one in very simple manner.

The individual heater units can assume various forms. Thus, for example, it is found advantageous to construct each such unit in the form of a U-tube with straight limbs for flow of the media to be heated in series therethrough. The connection pipes for the fluent medium, for example steam, are preferably provided in the vicinity of the free ends of the limbs of the corresponding U-tube such that they extend partway laterally from the limbs to which they are repectively connected in the plane of the U-tube, suchwise as to be directed towards one another into the space between the limbs. Approximately mid-way between the limbs of the U-tube the connection pipes are, however, bent off in opposite directions through a right angle in relation to their original directions and terminate in flanges or similar connecting means in the space between adjacent units.

According to a further feature of the invention, the electrically-operated heating elements are inserted through open free ends of the limbs of the U-tube. Preferably these heating elements consist of substantially straight, electrically-insulated heating resistances having terminals which, when the elements are removably mounted in position, are accessible from the exterior of the free ends of the limbs for connection to the source of electrical current.

Should for any reason, for example on account of the corrosive effect of the fluent medium on the heating resistances, it not be desirable to arrange these heating resistances inside the U-tube, it is instead feasible to provide the limbs of the U-tube with an external heater winding which may be separated from the wall of the U-tube by an appropriate layer of insulating material.

Each heater unit preferably has a drainpipe at its lowest point with a valve for the discharge of condensate formed in the U-tube, this drain pipe conveniently leading to pipe sections which form a substantially horizontally-disposed transverse pipe likewise furnished with end flanges for interconnection of the pipe sections.

A form of apparatus according to the invention, is illustrated by way of example in the accompanying drawings in which:

Fig. 1 is a front view of the apparatus,
Fig. 2 is a side view of the same, and
Fig. 3 is a plan.

In the example illustrated, the heater apparatus is made up of three heater units 1a, 1b, and 1c, each of which is of U-form. Each unit has an opening 2 into which a heater element can be inserted. In Fig. 1 of the drawings there is illustrated the head 3, with a terminal 4, of such a heater tube.

Welded into corresponding openings in the limbs of the U-tube, adjacent the free ends of these limbs, are connection pipes 5 for the fluent medium. As is apparent from Fig. 3, the connection pipes belonging to each heater unit first extend partway towards one another in the plane of the U-tube, and are then bent away from each other in opposite directions through a right angle lengthwise of the row of units, with all inlet conduits all extending in one direction and being connected to the limbs on one side of the row, and all the outlet conduits extending in the opposite direction and being connected to the limbs on the other side of the row. The ends of the connection pipes 5 are provided with flanges 6 which are connected to the corresponding flanges of adjacent heater units by screw means such as bolts, with a suitable packing between them, and all in a plane parallel to the U-tubes. In this way there is a self-supporting series of heater units which requires to be mounted or supported at the ends only.

Condensate forming in each of the various U-tubes is able to flow away through a conduit 7, equipped with a shut-off valve 8, into a header conduit 9, this being built up of a plurality of sections, one corresponding to each heater unit, which are likewise connected together by flanges 10.

It is to be understood that this invention is not restricted to the present disclosure as variations may be made without departing from the scope of the invention.

What we claim is:

1. In apparatus for heating or superheating fluid media by means of electrical means, comprising: a series of individually replaceable units arranged in spaced relation side-by-side in a row, each unit in the row comprising a U-shaped tube the separate limbs of which are spaced apart from each other and connected together at one end for flow of media to be preheated in series through the limbs of the unit, and separate inlet and outlet conduits connected with the free ends of the limbs of each unit for inflow of media to be heated to one limb and outflow of the media from the other limb of each unit, the inflow limbs of the units being all arranged on one side of the row and the outflow limbs of the units on the opposite side of the row, the respective inlet and outlet conduits of the limbs of each unit extending from their limbs partway toward the other limb and within the plane of their U-tubes, and then being bent in opposite directions from each other through an angle of about 90° to extend beyond the plane of their tubes and terminate in the space between their units and the next adjacent unit, with the inlet conduits of all units all extending in one direction and the outlet conduits of all units extending in the opposite direction lengthwise of the row, and connecting means disposed parallel to the planes of the U-tubes, and between the units, for detachably connecting the outlet conduit of each unit with the inlet conduit of the next adjacent unit, and electric heating means associated with each U-tube.

2. Apparatus as claimed in claim 1, and in which the electric heating means comprise substantially straight electrically insulated heating resistance elements detachable axially insertable removably through the free ends of the limbs of the U-tubes.

3. Apparatus as claimed in claim 1, and in which a vertical drain pipe for condensate is provided at the lowest point of each tube, the various drain pipes having a valve individual thereto and terminating in individual header sections with means for interconnection of the header sections together as a unit as a horizontal drain pipe line.

4. An electrical heating unit for apparatus for heating or superheating fluid media by electrical means, comprising: an individually replaceable unit constituted of a U-shaped tube the separate limbs of which are spaced apart from each other and connected together at one end for flow of media in series through the limbs of the unit, and separate inlet and outlet conduits connected with the free ends of the limbs for inflow of media to be heated to one limb and outflow of the media from the other limb, the respective inlet and outlet conduits of the limbs of the U-tube extending from their limbs partway toward the other limb of the unit into the space between the limbs and within the plane of the U-tube, and then being bent in opposite directions from each other through an angle of about 90° to extend beyond the plane of the U-tube and terminate in space beyond the side of the tube, with the inlet conduit terminal on one side and the outlet conduit terminal on the opposite side of the tube, and connecting means disposed parallel to the plane of the U-tube for detachable connecting the terminals of the inlet and outlet conduits of the unit with terminals of like outlet and inlet conduits of another like unit, and electric heating means associated with the U-tube unit.

ALBERT HÄBERLE.
FRITZ DITTMER.

References Cited in the file of this patent

UNITED STATES PATENTS

| Number | Name | Date |
|---|---|---|
| 1,318,237 | Sordi | Oct. 7, 1919 |
| 1,766,068 | De Lannoy | June 24, 1930 |
| 1,985,830 | Hynes | Dec. 25, 1934 |
| 2,237,808 | Berg | Apr. 8, 1941 |